E. E. ENGLUND.
PLANTER.
APPLICATION FILED APR. 2, 1919.
1,314,054.
Patented Aug. 26, 1919.
4 SHEETS—SHEET 3.
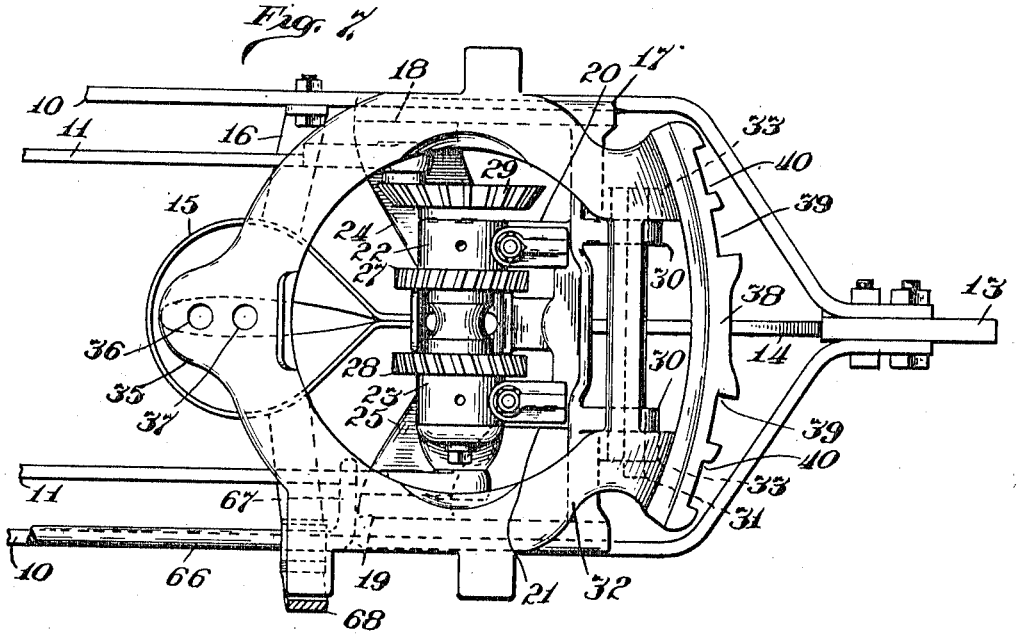
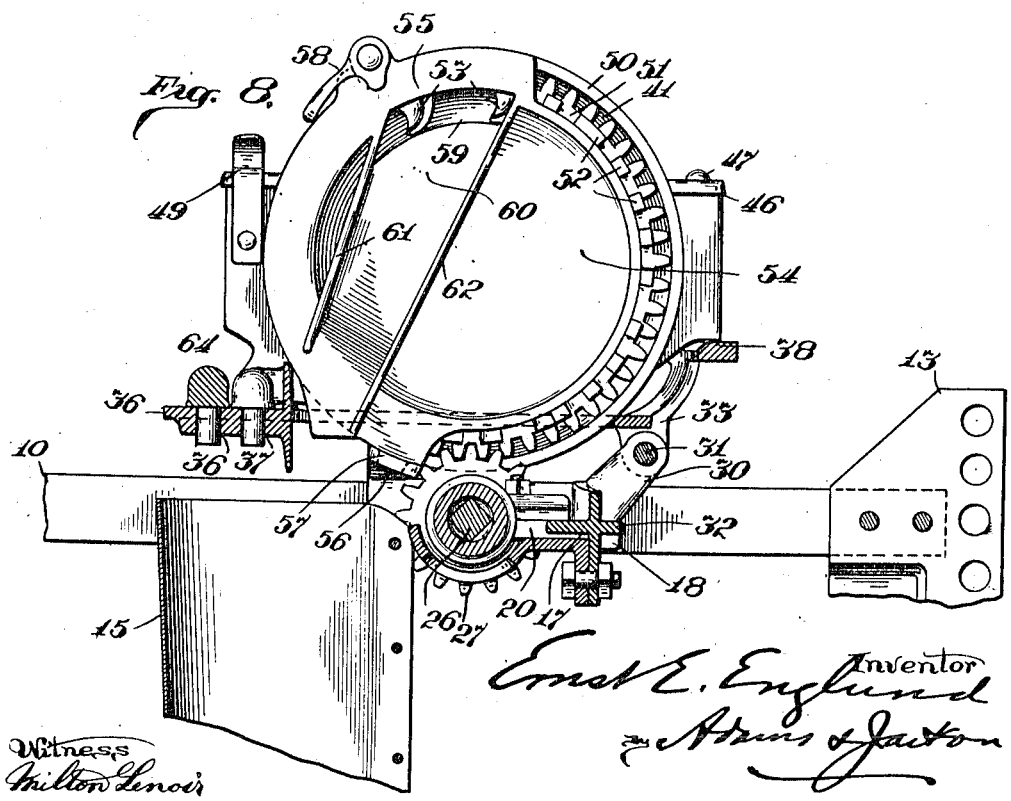

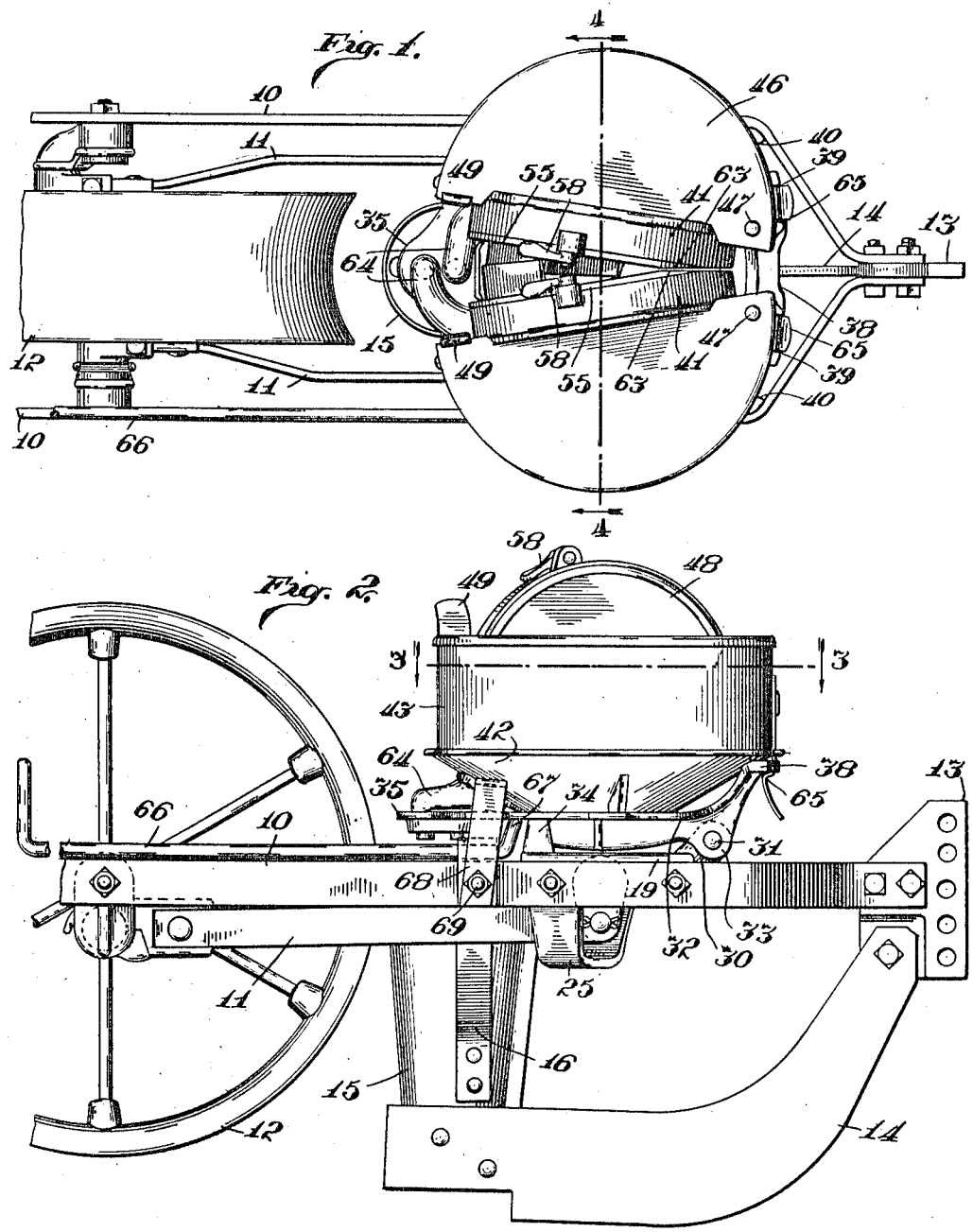

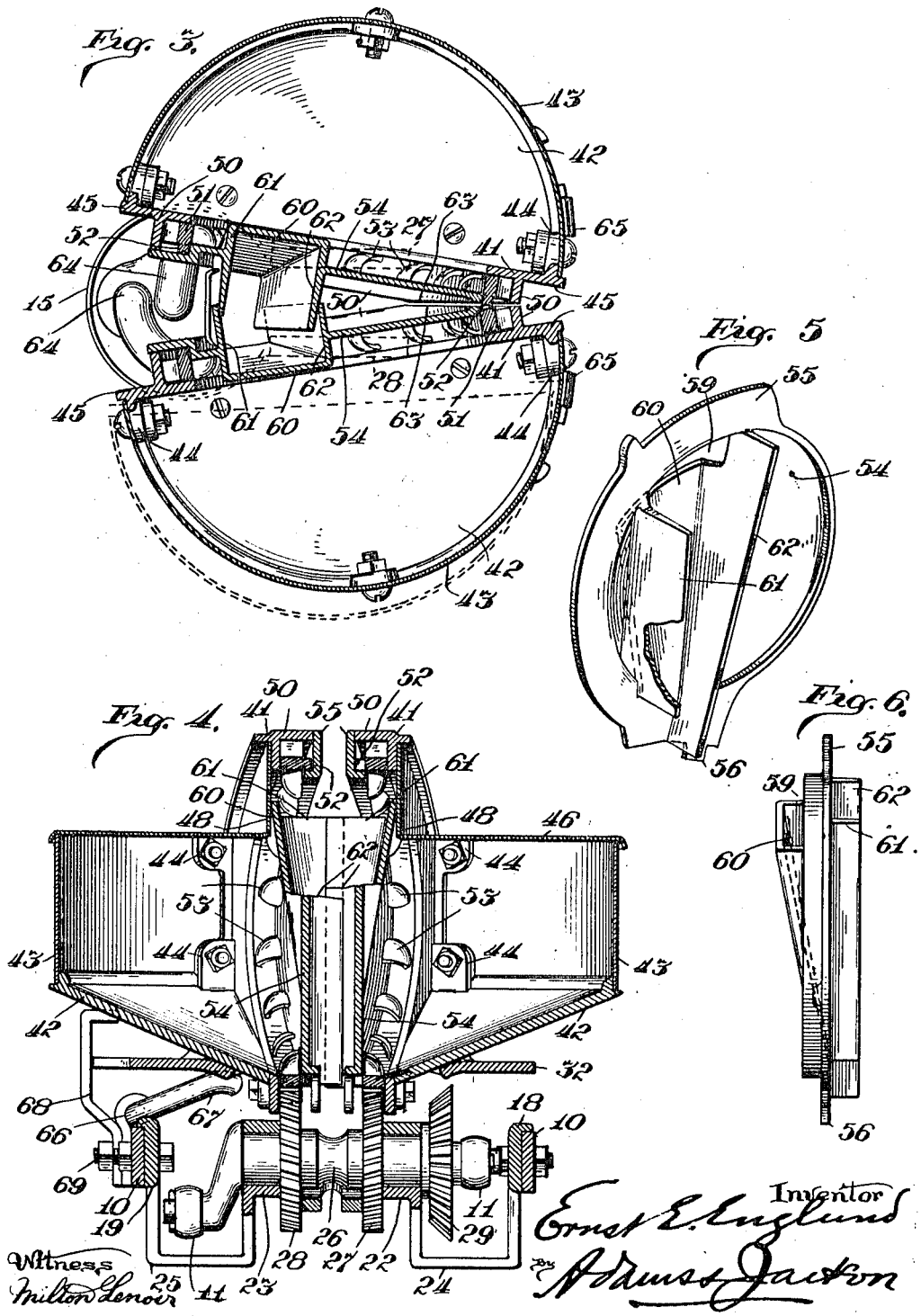

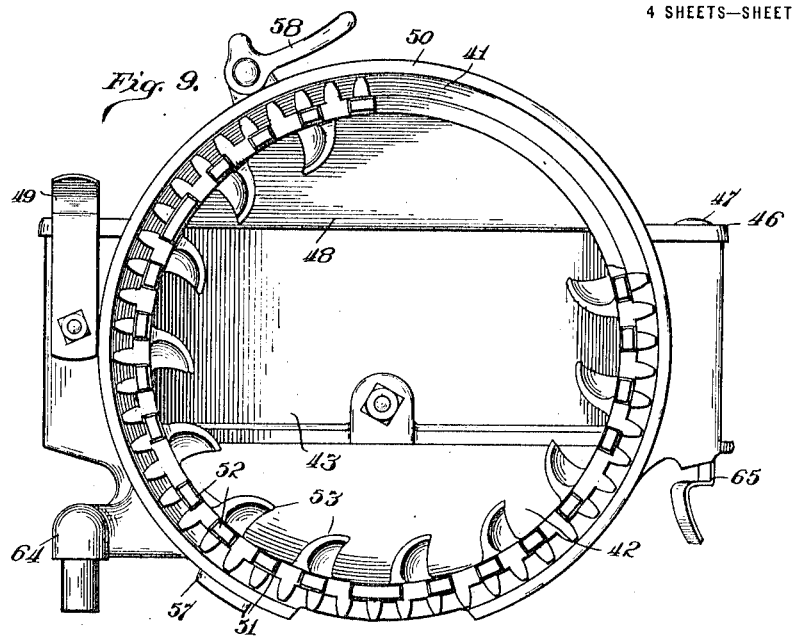
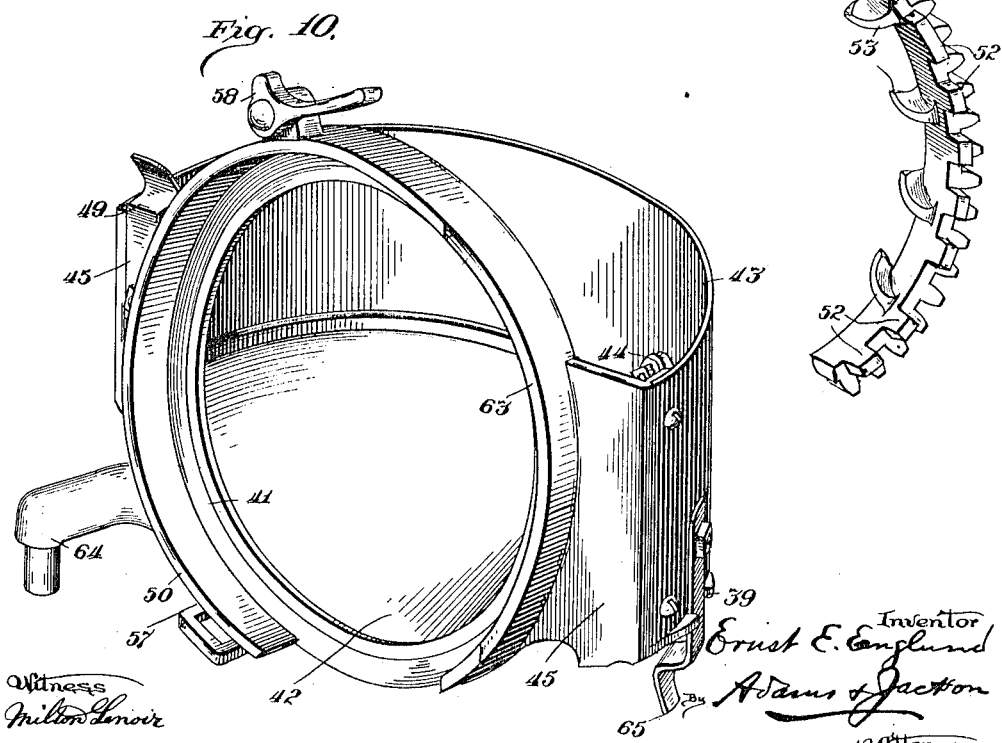

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

PLANTER.

1,314,054.   Specification of Letters Patent.   Patented Aug. 26, 1919.

Application filed April 2, 1919. Serial No. 286,832.

*To all whom it may concern:*

Be it known that I, ERNST E. ENGLUND, a citizen of the United States, and a resident of Moline, in the county of Rock Island and State of Illinois, have invented certain new and useful Improvements in Planters, of which the following is a specification, reference being had to the accompanying drawings.

This invention relates to improvements in machines for planting seeds or kernels of various kinds, and has for its leading object the provision of an improved hopper for containing seeds or kernels to be planted, and so arranging two of such hoppers with relation to each other that the rotating seed rings respectively mounted therein may be simultaneously and synchronously rotated to effect delivery of seeds from both hoppers or either or both hoppers may be moved to prevent either one or both of the seed-delivering rings from being rotated. It is further an object of the invention to so associate the said hoppers that their contents will be delivered along the same line on the ground or in the same furrow, and preferably through a chute common to both of them, so that thereby seeds of different character may be planted together in the same row, or where the same kind of seed is in both hoppers twice the amount may be deposited in the trench than if but a single hopper were in use. By my invention I also aim to improve generally the construction and operation of planters, all as hereinafter fully described. That which I believe to be new and desire to cover by this application will be set forth in the claims.

In the accompanying drawings,—

Figure 1 is a top or plan view of a planter embodying my improvements;

Fig. 2 is a side elevation of the machine shown in Fig. 1; in both these figures a portion of the single supporting wheel and a portion of the frame-work of the machine are broken away;

Fig. 3 is a horizontal section taken at line 3—3 of Fig. 2, the inoperative or non-delivery position of one of the hoppers being indicated by dotted lines;

Fig. 4 is a central vertical section taken at line 4—4 of Fig. 1;

Fig. 5 is a perspective view of the removable plate that acts as a closure for the inner side of one of the hoppers and upon the edge of which is rotatively mounted the seed ring for such hopper. The plate shown is that employed in connection with the hopper at the left-hand side of the machine. A portion of one of the seed-chute members that are formed on the outer face of the plate is partially broken away.

Fig. 6 is an edge view of the plate shown in Fig. 5;

Fig. 7 is a plan view of the front end of the machine with both hoppers removed;

Fig. 8 is a longitudinal central section through the supporting means for the hoppers, one hopper having been removed, and showing in elevation an inner face view of the other hopper and the gear for driving the seed-ring therein;

Fig. 9 is an inner face view of one of the hoppers with the end closure plate removed, and a portion of the seed-ring broken away to better show the annular hopper-member against which the ring rests;

Fig. 10 is a perspective view of a portion of the hopper, the view showing particularly the shape and construction of the annular member at the inner side of the hopper and to which the wall of the hopper is bolted; and Fig. 11 is a perspective view of a portion of the rotatable seed-ring.

Referring to the several figures of the drawings,—10 indicates the side bars of the main frame of the machine—the machine shown being a drill planter of the type wherein the dropping mechanism is positively actuated by pitmen connected to the crank axle upon which is secured a single supporting and covering wheel. The pitmen referred to are indicated by 11 and the supporting and covering wheel by 12. Such wheel is located near the rear end of the frame bars 10 and centrally thereof, and, as will be understood, to the rear end of the frame will be attached in the ordinary manner a pair of handles (not shown) to be held by the operator during the operation of the machine. The forward ends of the bars 10 are bent toward each other and have bolted between them a draft device 13, as usual, to which the forward upturned end of a runner 14 is secured, between the split or separated rear end of which is inserted and secured the lower end of a spout 15 through which the seed to be planted passes to the furrow made by the runner 14. The spout is braced in position by braces 16 riveted to it and bolted to the bars 10 as usual. Extending between the frame bars 10 a short distance back of their converging forward end portions is a casting that comprises a cross-bar member 17 and two bars 18—19, the latter lying against the inner faces of the bars 10, respectively, and being bolted thereto. Projecting rearwardly from the cross-bar member 17 are two arms 20—21 which are spaced a distance apart from each other and which respectively support axle bearings 22—23, additional support for said bearings being furnished by curved arms 24 and 25, respectively, which extend from the two side members 18 and 19. The axle supported in these bearings is indicated by 26, and suitably secured to such axle are the gears 27 and 28 that are employed to rotate the vertical seed rings hereinafter mentioned. These gears 27 and 28, it will be noted, are located at opposite sides of the center of the axle 26. 29 indicates a bevel gear also made fast to the axle, but such latter gear is not made use of in operating the seed rings that are employed in carrying out my invention, but is adapted to rotate the seed plate employed in an ordinary seed hopper when my improved hopper mechanisms are replaced by an ordinary hopper. The axle 26 is rotated by means of the pitmen 11, the forward ends of which are connected to cranks on the axle, one of such cranks in the construction shown being in the form of a wrist-pin formed on the outer face of the bevel gear 29. The cross-bar 17 which extends between the frame bars 10 is provided with two forwardly and upwardly projecting ears 30 through which passes a long pin or bolt 31 upon which is pivotally mounted a frame 32, the pin or bolt 31 passing through openings in downwardly extending ears 33 at the forward portion of the frame 32, such ears 33 being preferably cast integral with the frame 32. This frame 32 is, roughly speaking, of circular form and provided with a large central circular opening, as clearly shown in Fig. 7. 34 indicates two short posts rising from the rear ends of the members 18—19 which furnish supports upon which the frame member 32 rests. At the rear central portion of the frame member 32 such frame is enlarged rearwardly, as at 35, in which are formed two holes 36—37, respectively, one directly behind the other, which are adapted to receive pivots carried by the two hopper mechanisms that are employed as hereinafter described, and at the forward end of the pivoted frame 32 is formed a curved cross-bar 38 that, as best shown in Fig. 8, is held raised some distance above the plane of the main portion of the frame 32 by arms 39, preferably cast with the parts 32 and 38. This curved raised bar 38 forms a support for the two seed hoppers that are hereinafter described, and at each side of the center its front edge is provided with two notches 39—40, each set of notches being adapted to coöperate with a spring locking device carried by one of the seed hoppers mentioned so as to hold the seed hopper in either an operative or an inoperative position.

As before stated, the machine is provided with two hoppers. These hoppers are supported on opposite sides of the pivotally mounted frame 32 and each is adapted to be swung upon its own pivot toward or from the other so that both or either may be utilized for planting seed or both may be rendered inoperative when desired. Both hoppers are exactly alike in construction, except that one is intended for the right-hand side and the other for the left-hand side of the machine, and, therefore, naturally are not interchangeable side for side. The description of the mechanical construction and arrangement of the parts of one will, however suffice for both. Each hopper in the construction shown comprises a vertically disposed annular member 41 which is preferably of cast metal, and to the outer face of which is secured by bolts passing through suitable lugs formed with the member 41, a bottom piece 42, also preferably of cast metal, said bottom being shaped to provide a sloping inner wall, the lower portion of the face of which is flush with the inner edge of the annular member 41, as clearly shown in Fig. 4. To the substantially semi-circular upper edge portion of the hopper bottom 42 is secured by bolts or otherwise a correspondingly shaped hopper wall or body 43, the ends of such wall or body being, as shown, bolted to turned ears 44 that are formed on forwardly and rearwardly projecting extensions 45 of the annular member 41. The body 43 of the hopper has its upper end closed by a cover 46 pivoted at 47, such cover having, as shown, a vertical portion 48 that corresponds to and covers that portion of the opening in the annular member 41 that rises above the upper edge of the body 43. 49 indicates a spring latch secured on one of the extensions 45, such latch engaging over the edge of the cover 46 to hold it in place. Formed with and projecting outwardly from the outer marginal portion of the annular member 41 is a wide flange 50.

51 indicates a vertically mounted rotatable seed ring that fits within the flange 50 and rests against the outer face of the annular member 41 that carries such flange. The rim portion of the seed ring is provided with gear teeth and the flange 50 is suitably cut away at its lower part to allow such teeth to mesh with that one of the gears 27—28 over which the hopper member 41 is located and by reason of which engagement the seed ring will be rotated as the machine moves forward. Projecting from the outer face of the seed ring is an annular row of teeth 52, such rows of annular projecting teeth on the seed rings of the respective hoppers being adapted to engage with each other when the two hoppers are moved into position for simultaneously discharging seed, and, as is best shown in Fig. 8, some of the teeth 52 are longer than the others—correspondingly wide spaces being, of course, provided in the row of teeth on the other seed ring to receive them, such arrangement being provided to insure the two seed rings being so placed with relation to each other as to regulate the relative discharge of seed from the hoppers, as hereinafter described more particularly. The inner marginal portion of the seed ring is provided at regular intervals with fingers 53 which are so hollowed out or recessed as to form cells or cups adapted to receive and hold a grain or kernel that will be separated from the mass in the hopper as such fingers move therethrough, it being understood that the mass of seeds or kernels will, by reason of the sloping character of the hopper bottom gravitate into the path of the seed ring. The open side of the hopper is closed by a flat plate 54 that rests against the flattened outer faces of the annular row of fingers 53 and thus holds in the hopper the mass of seed upon which the fingers that constitute the said cups operate. This place 54 is provided with a comparatively wide vertical flange 55 at its outer margin that rests against the edge of the horizontal flange 50, as clearly shown in Figs. 4 and 8. When this flanged plate 54 is in position it not only forms a support upon which rests the laterally projecting teeth 52 of the seed ring, as best shown in Fig. 4, but when locked in place it holds such seed ring against lateral movement as well as forming, as stated, an effectual closure to retain the mass of seeds in the hopper. It is locked in place in the construction shown by means of a lug 56 (see Figs. 5 and 8) which enters an opening in a lateral lug 57 cast on the lower portion of the annular member 50 of the hopper and also by a latch 58 pivoted to a lug at the upper portion of said annular member 50, which latch as shown is adapted to engage over the face of the flange 55 on the plate 54. In the plate 54 near its upper edge is formed an opening therethrough, indicated by 59, and opposite this opening the plate 54 is shaped to provide a portion of an inclined chute 60. On the outer face of said plate 54 are formed two wide ribs 61 and 62 that constitute a portion of the two side walls of a complete chute through which seeds to be deposited in the ground will be carried to the spout 15. To form a complete chute the two ribs 61 and 62 of both plates have to coöperate, as very clearly shown in Fig. 3, and that they will do whether the hoppers are both in operative position or only one is in such position. By this construction, therefore, it will be seen that there is provided an expansible chute capable of properly conducting the seed to the spout 15 under any condition of use of the machine.

I have called attention to the fact that when the hoppers are so arranged as to make operative the seed rings in both hoppers the laterally extending teeth 52 will intermesh and this is permitted because the flat inner faces of the hoppers converge from rear to front, and because, as clearly shown in Fig. 8, the wide vertical flange 55 on the plate 54 extends only partially around such plate 54, thus leaving the teeth 52 exposed at the front portion of the hopper. This in itself would not be sufficient to allow of the desired intermeshing of the two seed rings, so to allow of their proper projection. For this purpose the laterally extending flange 50 of the annular member 41 is materially narrowed at its forward portion, as indicated clearly in Figs. 3 and 10 at 63, and the edge portion of the closure plate 54 upon which the said teeth 52 ride is also somewhat narrower. By reason of the narrowing of these two parts at this place the said teeth 52 can project sufficiently to intermesh with the opposite ring. While reliance is not placed on this intermeshing to insure the driving of one seed ring from the other, inasmuch as each is positively driven from its own gear on the axle 26, yet such intermeshing aids in steadying the plates while rotating, but the chief function of such intermeshing is to permit the dropping of seeds from the two hoppers alternately, which is accomplished by reason of the two rings having to be so arranged with relation to each other that one of the wide teeth 52 will come opposite a correspondingly wide space in the other ring. By reason of that arrangement and by reason of the arrangement of the fingers 53 that carry the individual seeds so that a finger on each ring will not come to the depositing point at exactly the same time such alternate dropping is effected, which in some instances is desirable.

At the rear and lower portion of each of the annular members 41, and preferably cast therewith, is a short arm 64 whose downwardly turned end is shaped to provide a cylindrical stud that enters one of the holes 36—37 formed in the rearward extension 35 of the supporting plate 32. One of these arms 64 is curved so as to carry it around in rear of the other arm, as clearly shown in Fig. 3, thus effecting a hinging or pivoting of the two hoppers on the same longitudinal central line. To the front wall of each hopper body 43 is suitably attached, in the construction shown, a spring latch 65 that can be sprung into either of the notches 39—40 at one side of the center of the bar 38. When the latch 65 of the hopper is in its innermost notch 39 the gear teeth of the seed ring of that hopper will be in engagement with its driving gear on the shaft 26, but when such latch is in engagement with its outer notch 40 such seed ring will have been swung to one side of its driving gear and hence will remain inactive, but such swinging of that hopper to its outermost or inactive position will not in any wise affect the operation of the seed mechanism in the other hopper during the advance of the machine. It will be noted (see Fig. 4) that the teeth of the two driving gears 27—28 are slightly inclined and they are so made to adapt them to fit the gear teeth on the respective seed rings, for, as best shown in Figs. 1 and 3, the hoppers containing these seed rings are in a slightly inclined position when in seed delivering position—the teeth of the seed rings themselves being also preferably slightly inclined or beveled to permit the ready engagement and disengagement with the drive gears and their proper meshing with such gears.

It is sometimes desired to promptly throw both of the hoppers into a position that will stop the operation of their seed rings temporarily, and I provide for this purpose a rod 66 extending alongside of one of the frame bars 10 and suitably connected therewith so as to be rotatable when desired, upon the forward end of which rod is formed a crank 67 that lies beneath the hopper-supporting frame member 32 near the rear of such member. By turning this rod 66, which the operator can readily do by grasping the turned rear end thereof that forms a handle, the crank will force the hopper support 32 to turn upward on its pivot 31, thus raising the hoppers entirely clear of the drive gears 27—28; and to prevent the hopper support from shaking and jarring to an extent that might permit the rod 66 to turn and permit the dropping down again of the hopper support I provide a latch 68 that is pivoted at 69 to the adjacent frame bar 10, which latch has an inwardly turned end that overlies the hopper support member 32 and when the crank is turned to force the said member 32 upward such member will be gripped between the end of the crank and the turned end of the latch 68 and be firmly held in its raised position. When the necessity for keeping the hoppers out of operative position has passed a quarter turn of the cranked rod 66 will instantly allow the support 32 and the hoppers carried thereby to drop down into normal working position again.

In operation with the hoppers in position relatively to each other as in Fig. 1 and as shown in full lines in Fig. 3, and with a mass of seeds or kernels in both hoppers, a forward movement of the machine will result in a rotation of the two seed rings and as the several fingers 53 of these rings pass through the quantities of seeds or kernels each will receive in the cell that is formed by recessing its inner face one or more such seeds or kernels and carry the same forwardly and toward the top of the annular member 41 of the hopper. If more than one such seed or kernel has been raised in this manner the excess over one will ordinarily drop out before the finger has reached the point where it is supposed to discharge into the chute that conducts the materials to be planted to the spout 15, and consequently but one such seed or kernel at a time will be discharged into the chute—the excess falling back into the mass in the hopper body. The kernels that are brought up for discharge through the opening 59 cannot pass back into the body of the hopper because the upper end of that member 60 of the chute that is cast with and forms part of the plate 54 lies closely against the upturned member 48 of the hopper-body cover, as clearly shown in Fig. 4, and hence any seed or kernel that leaves its carrying cell after the finger in which such cell is formed has come opposite the opening 59 must pass down the chute that is formed by the wall members 60 and the ribs 61 and 62 of the two hopper closure plates 54.

The size and shape of the fingers that are recessed to form the seed cells may be varied considerably from that shown in order to better adapt them to the carrying of seeds or kernels of different kinds, and the number of such fingers to each seed ring may be varied as desired. Indeed, I contemplate providing a number of seed rings for each hopper, which rings will differ from one another in the particulars thus mentioned, said rings being interchangeable one with another so as to adapt the machine for planting any kind of seed or kernel desired, and it is, of course, evident that one kind of seed ring may be used in one hopper while at the same time in the other hopper will be employed a seed ring having differently shaped fingers or a greater or less number of fingers in order that different materials in the two hoppers may be simultaneously and properly dropped through the chute and spout to the ground.

The hoppers can be very readily and quickly removed when desired as all that is necessary to do is to swing one or both of them on their pivot pins 64 so as to draw the laterally projecting teeth 52 out of mesh with each other and then lifting the hoppers up so as to pull their pivot pins out of engagement with their respective holes 36—37. This preliminary sidewise turning of a hopper or both of the hoppers can be accomplished after a springing out of one or both of the latches 65 from engagement with the cross-bar 38. Being able to lift either hopper off of the supporting frame 32 in this easy manner is frequently desirable not only for the purpose of gaining access to the mechanism below the hoppers for oiling or repairing, but it has the advantage of enabling a hopper to have its contents poured out rather than scooped out by hand, and such removal also enables the user to readily replace one seed ring with another whenever desired. Furthermore, it is evident that if at any time it is desired to convert the machine into one of the ordinary character wherein a single seed box or hopper is employed such change can be effected by removing the pivot pin 31 that holds the hopper supporting frame 30 in place, after which the usual supporting plate for a single hopper can be placed on the machine and have the teeth on its horizontal seed ring mesh with the bevel gear 29, as usual, and in so doing it would not be necessary to move or disturb the two gears 27—28 that are employed to drive the vertical seed rings of my improved machine.

What I claim as my invention and desire to secure by Letters Patent, is—

1. In a planter, the combination of two seed-hoppers arranged side by side, a rotating member in each hopper for successively raising seeds in the hopper to and discharging them through an opening in the wall and near the top of the hopper, a chute into which seeds from both hoppers are discharged, and means for rotating said seed raising members.

2. In a planter, the combination of two seed-hoppers arranged adjacent to each other and movable toward and from each other, a rotating member in each hopper for successively raising seeds in the hopper and discharging them through an opening near the top of the hopper, means for conducting the seeds to the ground, and means for rotating both of said seed raising members simultaneously or either one separately.

3. In a planter, the combination of two seed-hoppers arranged adjacent to each other and movable toward and from each other, a rotating member in each hopper for successively raising seeds in the hopper and discharging them through an opening near the top of the hopper, a chute into which seeds from both hoppers are discharged, and means for rotating both of said seed raising members simultaneously or either one separately.

4. In a planter, the combination of two seed-hoppers arranged adjacent to each other and movable toward and from each other, a rotatable ring in each hopper having cells or pockets for receiving seeds and raising them to and discharging them through an opening in the upper portion of the hopper, means for causing said plates to engage with each other when the hoppers are moved toward each other, means for conducting the seeds to the ground, and means for positively driving both of said rings simultaneously or either one separately.

5. In a planter, the combination of two seed-hoppers arranged adjacent to each other and movable toward and from each other, a rotatable ring in each hopper having cells or pockets for receiving seeds and raising them to and discharging them through an opening in the upper portion of the hopper, said rings inclining toward each other and being provided with means that interengage when the hoppers are moved toward each other, means for conducting the seeds to the ground, and means for positively driving both of said rings simultaneously or either one separately.

6. In a planter, the combination of two seed-hoppers each pivoted at one end so that they may be turned to move their opposite ends toward or from each other, means for locking the hoppers in their different positions, a rotatable ring in each hopper provided with a plurality of cells or pockets for receiving seeds and raising them to and discharging them through an opening in the upper portion of the hopper, and means for rotating said rings simultaneously or either one separately.

7. In a planter, the combination of an axle, means for rotating the same, two gears fast on said axle, two horizontally-movable hoppers supported side by side above said axle, a vertical seed ring in each hopper, each of said rings being toothed to mesh with one of said gears, and means for separately locking said hoppers in different positions whereby either or both of said rings may be held in or out of mesh with their respective gears.

8. In a planter, the combination of an axle, means for rotating the same, two gears fast on said axle, a supporting frame above the axle, two hoppers carried by said frame and movable toward and from each other, a vertical seed ring in each hopper, each of said rings being toothed to mesh with one of said gears, and means for separately securing said hoppers in different positions on said supporting frame whereby either or both of said rings may be held in or out of mesh with their respective gears.

9. In a planter, the combination of an axle, means for rotating the same, two gears fast on said axle, two horizontally-movable hoppers supported side by side above said axle, a vertical seed ring in each hopper, each of said rings being provided with teeth on its rim to mesh with one of said gears and also provided with laterally-projecting teeth adapted to mesh with the corresponding teeth on the other ring when the two hoppers are moved into close relation with each other, and means for holding either or both of said hoppers in an operative or inoperative position.

10. In a planter, the combination of two hoppers arranged side by side and movable toward and from each other, means in each hopper for successively elevating seeds to be discharged through a lateral opening near the upper end of the hopper, and a chute for conducting seeds discharged through the openings in both hoppers, said chute comprising coöperating members carried by both hoppers.

11. In a planter, the combination of two hoppers arranged side by side and movable toward and from each other, means in each hopper for successively elevating seeds to be discharged through a lateral opening near the upper end of the hopper, and a chute for conducting seeds discharged through the openings in both hoppers, said chute comprising ribs on the inner face of each hopper that remain in chute-forming relation when both of the hoppers are in an operative position and also when only one of said hoppers is in such position.

12. In a planter, a hopper comprising a body, an inclined bottom and an annular member at one side of said body and bottom, in combination with a rotatable seed ring located against one face of said annular member, a closure plate removably secured against said annular hopper-member and provided with an opening in its upper portion through which seeds carried up by the seed ring are discharged, means on said plate communicating with said opening for directing the seeds downward, and a driving gear meshing with said ring to rotate it.

13. In a planter, the combination of two hoppers each comprising a body, an inclined bottom and an annular member at one side of said body and bottom, said hoppers being movable toward and from each other, a rotatable seed ring located against one face of each annular member, a closure plate for each hopper located against the annular member thereof and provided with an opening in its upper portion for the discharge of seeds, coöperating devices carried by the closure plates respectively and constituting a chute for the reception of seeds from either or both of said openings, and means for positively rotating said rings.

14. In a planter, the combination of two hoppers each comprising a body, an inclined bottom and an annular member at one side of said body and bottom, said hoppers being movable toward and from each other, a rotatable seed ring located against one face of each annular member, a closure plate for each hopper located against the annular member thereof and provided with an opening in its upper portion for the discharge of seeds, coöperating devices carried by the closure plates respectively and constituting a chute for the reception of seeds from either or both of said openings, and means for positively rotating both of said rings when they are in their closest relation or either one of said rings when the hopper containing the other ring is moved away.

15. A planter comprising in combination two hoppers arranged side by side and movable toward and from each other, a seed ring located adjacent the inner wall of each hopper and adapted to deliver seeds through an opening in such wall, said rings converging toward each other when the hoppers are in operative position, and means for rotating said rings when the hoppers are in operative position or rotating only the ring of one hopper when the other hopper has been moved away therefrom.

16. A planter comprising in combination two hoppers arranged side by side and movable toward and from each other, a seed ring located adjacent the inner wall of each hopper, said rings converging toward each other when the hoppers are in operative position, means on said rings that intermesh with each other when said hoppers are both in operative position, and means for rotating said rings when both hoppers are moved toward each other or rotating only the ring of one hopper when the other hopper has been moved away therefrom.

17. In a planter, the combination of two seed-hoppers arranged side by side and movable toward and from each other, and a rotating member in each hopper for raising seeds in the hopper, said rotating members being arranged in close proximity to the inner end walls of the respective hoppers, and each of said end walls having an opening in its upper portion for the discharge of seeds.

18. In a planter, the combination of two seed-hoppers arranged side by side and movable toward and from each other, a rotating member in each hopper for raising seeds in the hopper, said rotating members being arranged in close proximity to the inner end walls of the respective hoppers, each of said end walls having an opening in its upper portion for the discharge of seeds, and means carried by said end walls constituting a chute for the seeds discharged through both of said openings.

ERNST E. ENGLUND.